(12) United States Patent  
Kyi et al.

(10) Patent No.: US 8,571,375 B1  
(45) Date of Patent: Oct. 29, 2013

(54) RELEASE MECHANISM AND TRANSCEIVER MODULE USING THE SAME

(76) Inventors: George Kyi, Fremont, CA (US); Robert Golden, Discovery Bay, CA (US); Iggoni Fajardo, Fremont, CA (US); Manfred Schmed, Livermore, CA (US)

( * ) Notice: Subject to any disclaimer, the term of this patent is extended or adjusted under 35 U.S.C. 154(b) by 22 days.

(21) Appl. No.: 13/531,668

(22) Filed: Jun. 25, 2012

(51) Int. Cl.
- *G02B 6/00* (2006.01)
- *G02B 6/36* (2006.01)
- *H01R 13/62* (2006.01)

(52) U.S. Cl.
USPC .............................. 385/134; 385/92; 439/372

(58) Field of Classification Search
USPC .......................................... 385/134; 439/372
See application file for complete search history.

(56) References Cited

U.S. PATENT DOCUMENTS

| | | | | |
|---|---|---|---|---|
| 6,887,092 | B2 * | 5/2005 | Minota | 439/372 |
| 7,317,862 | B2 * | 1/2008 | Minota et al. | 385/134 |
| 2004/0077226 | A1 * | 4/2004 | Murr et al. | 439/701 |

* cited by examiner

*Primary Examiner* — Omar Rojas  
(74) *Attorney, Agent, or Firm* — Richard C. Vershave; Foster Pepper PLLC

(57) ABSTRACT

A release mechanism for releasing a transceiver module from a cage includes a fixed component, a locking component, and a pull component, where the locking component is used for locking the transceiver module in the cage and pivotally connected to the transceiver module. The user pulls the pull component to make the locking component to rotate to unlock and then draw out the transceiver module. The locking component further includes a spring part against the fixed component to resist the rotation and assist the locking component back to the original position. According to the fewer components and the easy assembly of the release mechanism, the total assembly cost of the transceiver module can be reduced significantly.

10 Claims, 6 Drawing Sheets

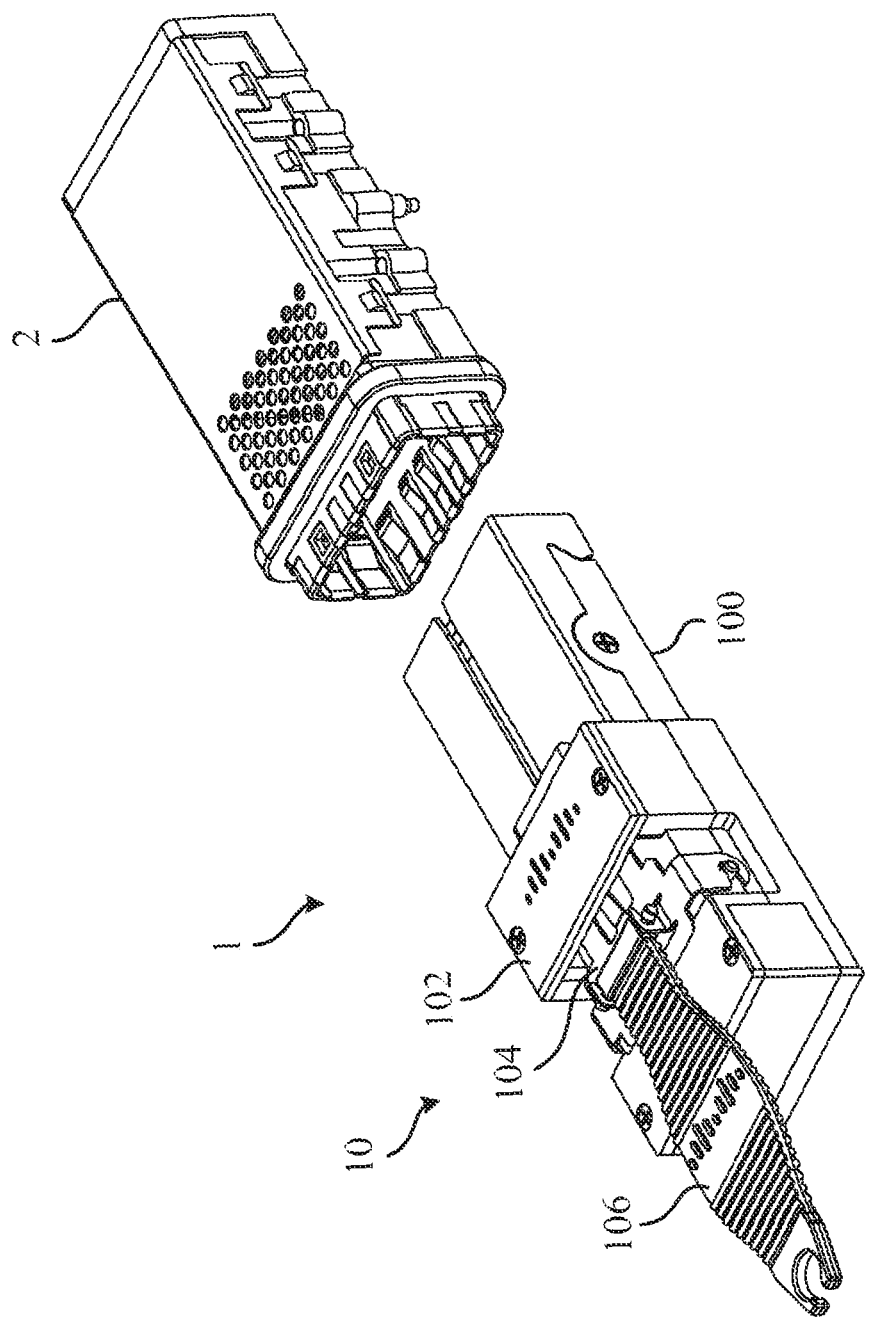

RELEASE MECHANISM AND TRANSCEIVER MODULE USING THE SAME

BACKGROUND OF THE INVENTION

1. Field of the Invention

This invention relates to a release mechanism and a transceiver module, and more particularly; to the release mechanism for releasing the transceiver module from the cage and the transceiver module using the release mechanism.

2. Description of the Prior Art

Computers and related peripheral equipment, as well as satellite and communication systems, have in the recent past evolved extremely rapidly. These systems require ever increasing data transfer rates to perform the highly complex task that drive the systems, such as digital signal processing, image analysis, and communications. With current demands, optical couplers are used to transfer signals over short and long distances between computers, between two circuit boards in one computer, and even between multiple chips on a single printed circuit board. The use of high speed optical signals in place of electrical interconnections increases the achievable data transfer rate.

An optical transmitter/receiver (transceiver) module typically includes both light emitting devices such as vertical cavity surface emitting lasers (VCSEL's) and light detecting device such as photodiodes. Driver/receiver circuitry modules, typically in the form of application specific integrated circuit (ASIC) chips, include driver circuitry for receiving signals from one device and drive the VCSEL's in response. The ASIC also includes receiver circuitry for receiving signals from the photodiodes and, in response, for processing those signals into an appropriate output. The combination of the VCSEL's, the photodiodes, and the ASIC circuitry is commonly referred to as an optical transceiver or a fiber optic transceiver.

As the density of the optical arrays increases, coupling a fiber optic cable to the arrays becomes an increasingly complex task. It is very important to align the active area of each emitter and detector with a corresponding fiber of the fiber optic bundle. The mechanical connection means therefore undergo a corresponding increase in importance. Fiber optic connectors are therefore of great interest in the current art. As such, improvements in the reliability and ease of manufacturing of such connectors are always welcome.

In the applications which are of interest in the present invention, local connector (LC) plugs are received in a pair of bays in a fiber optic transceiver module housed or locked in a cage that is permanently mounted to a printed circuit board (PCB). The locking state is imperative for ensuring data transmission or receiving. If the user wants to remove the transceiver module from the cage, a release mechanism is used for unlocking the fiber optic transceiver module. However, there are too many components in the release mechanism in the prior art, resulting in high cost and complicated assembly of the release mechanism.

SUMMARY OF THE INVENTION

One object of the present invention is to provide a novel release mechanism to solve the problem in the prior art.

According to an embodiment of the invention, the release mechanism is used for releasing a transceiver module from a cage. The release mechanism comprises a fixed component, a locking component, and a pull component. The fixed component is fixed on the transceiver module. The locking component has a connecting part pivotally connected to the transceiver module to enable the locking component to rotate relatively to the connecting part, a hook opposite to the connected part and for locking the transceiver module in the cage, and a spring part configured between the connecting part and the hook and for resisting the rotation of the locking component. The pull component is connected to the locking component and for pulling the locking component to rotate to release the hook and the transceiver module from the cage. Accordingly, the user can easily release the transceiver module from the cage by pulling the pull component, and the cost can be reduced by the easy assembly of the release mechanism.

Another object of the present invention is to provide a novel transceiver module to solve the problem in the prior art.

According to an embodiment of the invention, the transceiver module is used for providing a connection of different types of optic fiber. The transceiver module comprises a case, a fixed component, a locking component, and a pull component. The case is for accepting a print circuit board and being plugged in a cage. The fixed component is fixed on the case. The locking component has a connecting part pivotally connected to the case to enable the locking component to rotate relatively to the connecting part, a hook opposite to the connected part and for locking the case in the cage, and a spring part configured between the connecting part and the hook and for resisting the rotation of the locking component. The pull component is connected to the locking component and for pulling the locking component to rotate to release the hook and the case from the cage. Accordingly, the user can easily release the transceiver module from the cage by pulling the pull component, and the cost can be reduced by the easy assembly of the release mechanism.

On the advantages and the spirit of the invention, it can be understood further by the following invention descriptions and attached drawings.

BRIEF DESCRIPTION OF THE APPENDED DRAWINGS

FIG. 1A is a schematic drawing illustrating a transceiver module according to an embodiment of the invention.

DETAILED DESCRIPTION OF THE INVENTION

Figure 1B:
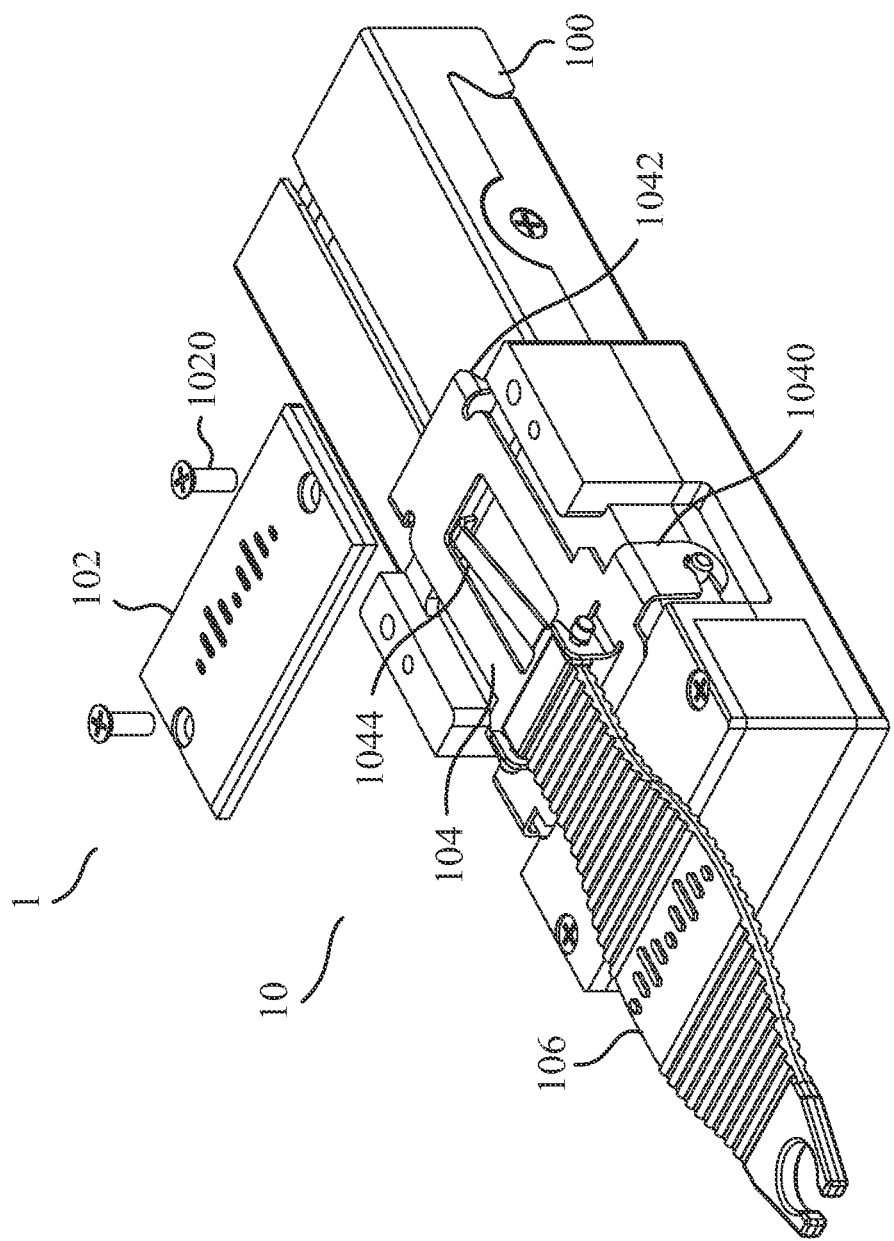
FIG. 1B is a detail schematic drawing illustrating the release mechanism of transceiver module in FIG. 1A.

Please refer to FIG. 1A and FIG. 1B. FIG. 1A is a schematic drawing illustrating a transceiver module 1 according to an embodiment of the invention, and FIG. 1B is a detail schematic drawing illustrating the release mechanism 10 of transceiver module 1 in FIG. 1A. The transceiver module 1 is used for connecting different types of optic fiber. As shown in FIGS. 1A and 1B, the transceiver module 1 includes a case 100, a fixed component 102, a locking component 104, and a pull component 106. The case 100 is used for accept a print circuit board (not shown in the FIGURES), and being plugged into a cage 2 to form a connector for optic fiber.

The fixed component 102, the locking component 104, and the pull component 106 form the release mechanism 10 which is for releasing the transceiver module 1 from the cage 2. In this embodiment, the fixed component 102 is fixed on the case 100 of the transceiver module 1 by screws 1020. It should be noted that the fixed component 102 can be fixed on the case 100 by other means in practice. The locking component 104 includes a connecting part 1040 configured on one side of its main body, a hook 1042 configured on the other side of the main body and opposite to the connecting part 1040, and a spring part 1044 configured between the connecting part 1040 and the hook 1042. The pull component 106 is connected to the locking component 104.

The connecting part 1040 is pivotally connected to the case 100, so that the locking component 104 can rotate relatively to the connecting part 1040. The spring pan 1044 is against the fixed component 102, and the elastic restoring force provided by the spring part 1044 assists the hook 1042 to lock the case 100 in the cage 2. It should be noted that there are two connecting parts and two hooks in the embodiment, however, the amount of connecting parts and hooks are not limited in the embodiment, but depend on the requests of the user or designer.

Figure 1C:
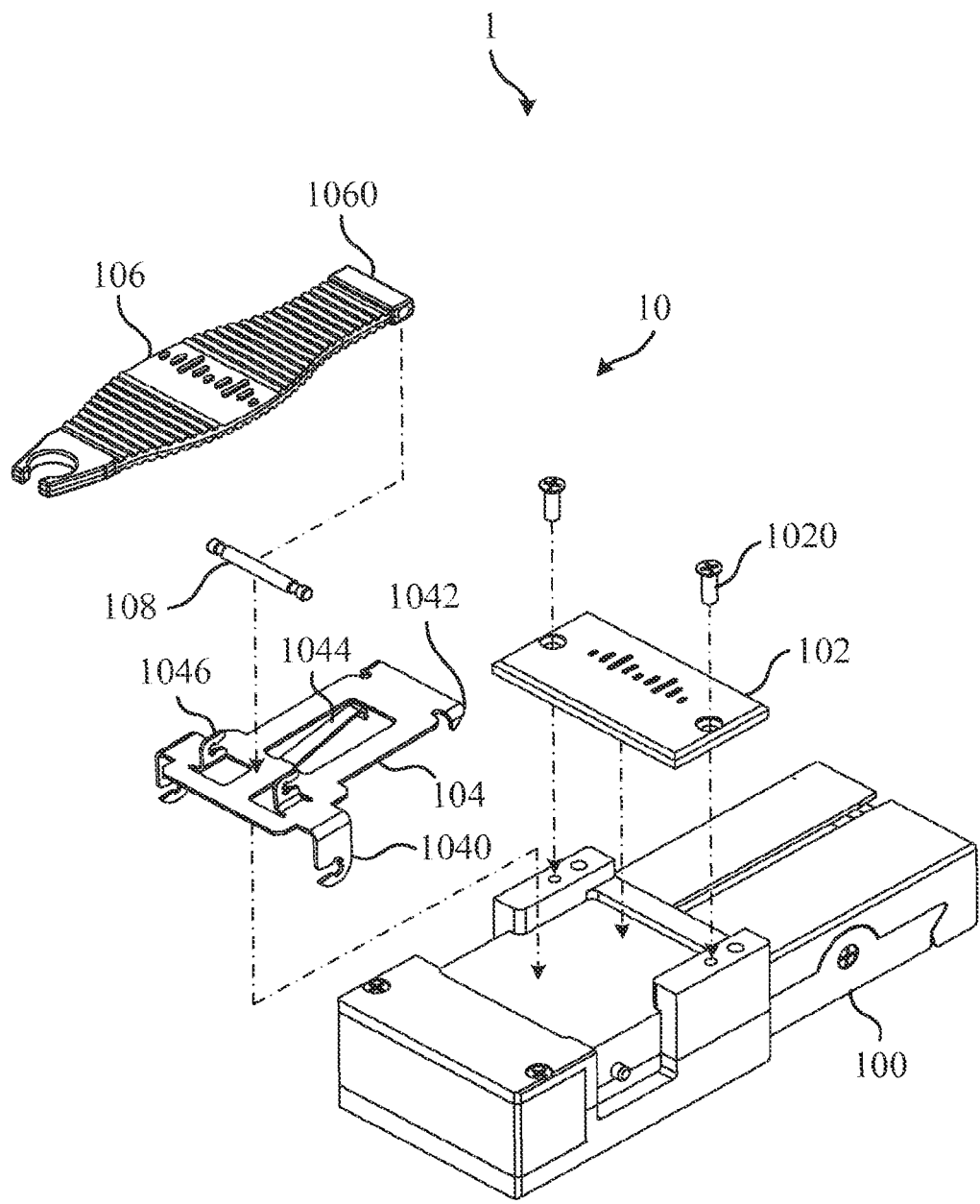
FIG. 1C is an explosion diagram illustrating the transceiver module in FIG. 1B.

Please refer to FIG. 1C. FIG. 1C is an explosion diagram illustrating the transceiver module 1 in FIG. 1B. The release mechanism 10 further includes a connecting pin 108 for connecting the locking component 104 and the pull component 106. In detail, the connecting pin 108 can be plugged in the sheath 1060 of the pull component 106, and then be fastened on the locking component 104 by the fastening part 1046 of the locking component 104, as shown in FIG. 1C. Therefore, the user can pull the pull component 106 to make the locking component 104 to rotate relatively to the connecting pan 1040. Once the user stops pulling, the elastic restoring force of spring part 1044 recoveries the locking component 104 and the hook 1042 back to the original position. In this embodiment, the spring part 1044 is a leaf spring extending from the main body of the locking component 104, however, the spring pan are not limited in the leaf spring, but any type of elastic object which provides elastic restoring force can be adopted as the spring part in practice.

The locking component 104 locks the case 100 of the transceiver module 1 in the cage 2 when the case 100 is plugged into the cage 2. In the locking state, the hook 1042 lodges in the structure of the case 100, so as to prevent the case 100 or the transceiver module 1 from coming off from the cage 2. The transceiver module 1 can be released and removed from the cage 2 by pulling the pull component 106 of the release mechanism 10. Please refer to FIG. 2A and FIG. 2B, FIG. 2A is a schematic drawing illustrating that the transceiver module 1 in FIG. 1A is locked in the cage 2, and FIG. 2B is a schematic drawing illustrating that, the pull component 106 in FIG. 2A is pulled to release the transceiver module 1 from the cage 2.

Figure 2A:
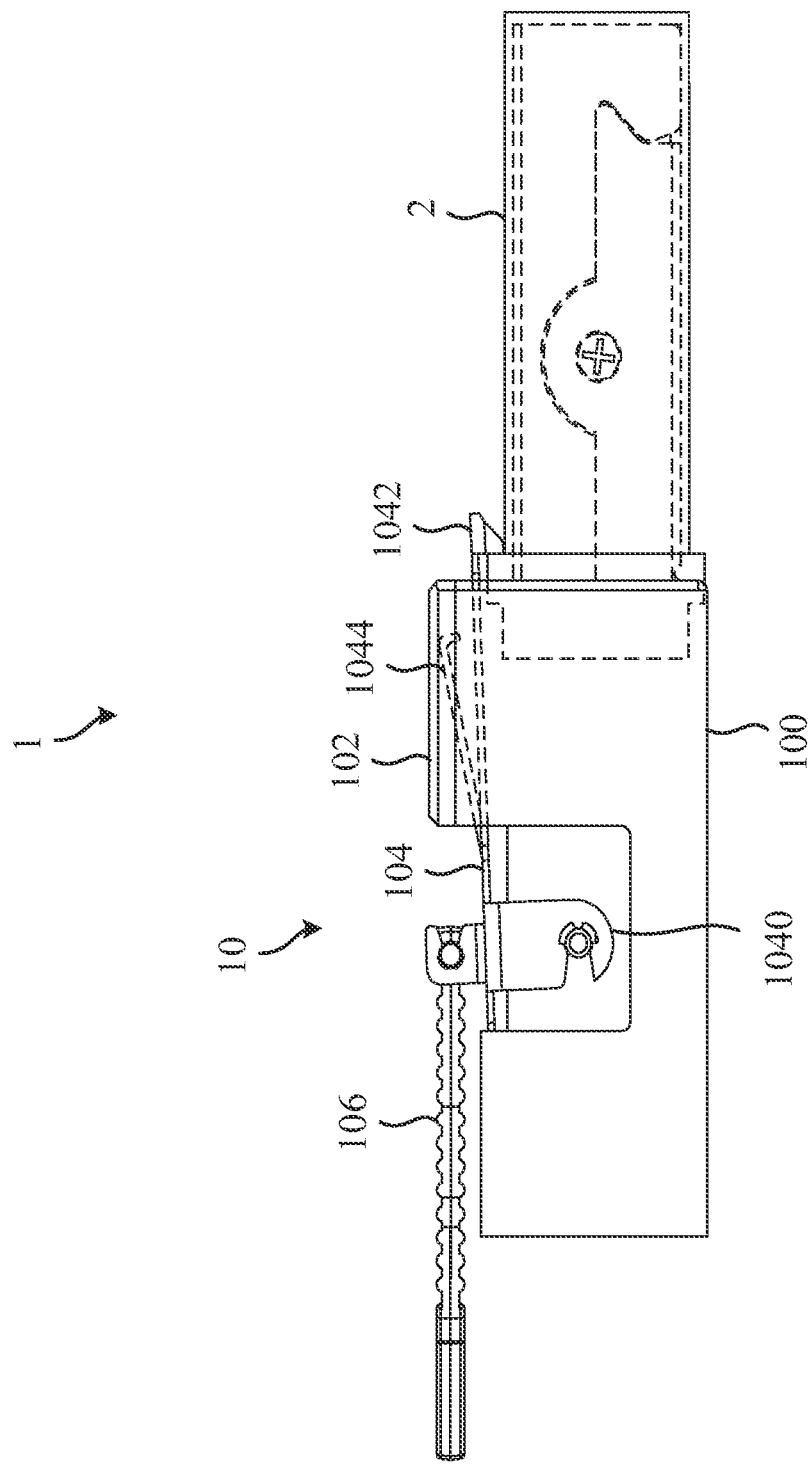
FIG. 2A is a schematic drawing illustrating that the transceiver module in FIG. 1A is locked in the cage.
Figure 2B:
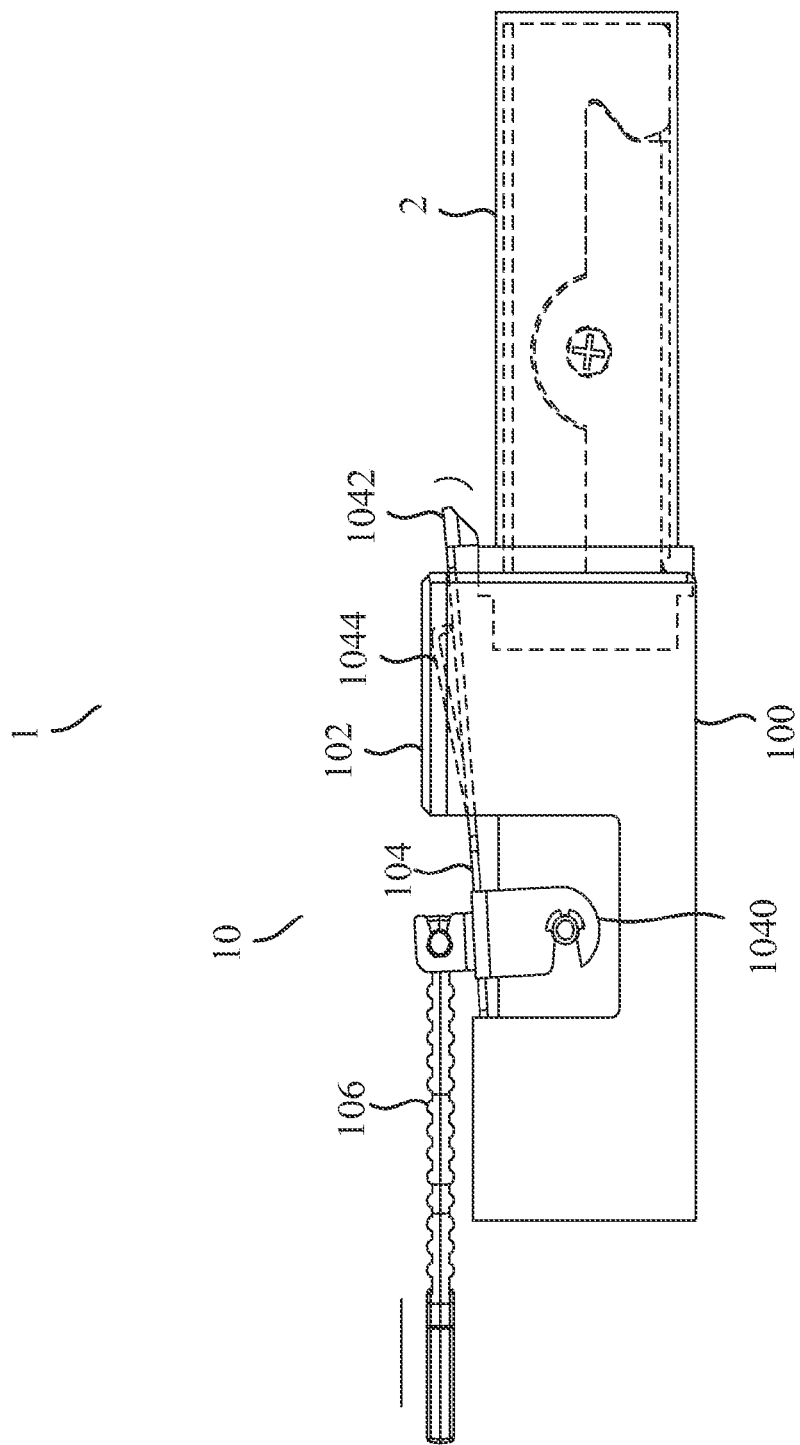
FIG. 2B is a schematic drawing illustrating that the pull component in FIG. 2A is pulled to release the transceiver module from the cage.

As shown in FIG. 2A, the case 100 of the transceiver module 1 is in locking state, and the spring component 106 keeps the hook 1042 lodging in the structure of the cage 2. When the user pulls the pull component 106, the pull component 106 pulls the connecting pin 108 and then causes the locking component 104 to rotate, so that the hook 1042 is drawn out from the cage 2 and no long locks the case 100, as shown in FIG. 2B. That is to say, the case 100 of the transceiver module 1 enters the unlocking state. As the transceiver module 1 enters the unlocking state, the transceiver module 1 can be removed from the cage 2 when the user keeps pulling. In the unlocking state, the spring part 1044 is compressed by the fixed component 102 and the main body of the locking component 104, and the deformation of the spring part 1044 provides the elastic restoring force resisting the rotation of the locking component 104. Once the user stops pulling, the elastic restoring force assists the hook 1042 and the locking component 104 back to the original position. Accordingly, the user can easily unlock and remove the transceiver module 1 just by one step of pulling the pull component 106 of the release mechanism 10.

Figure 3:
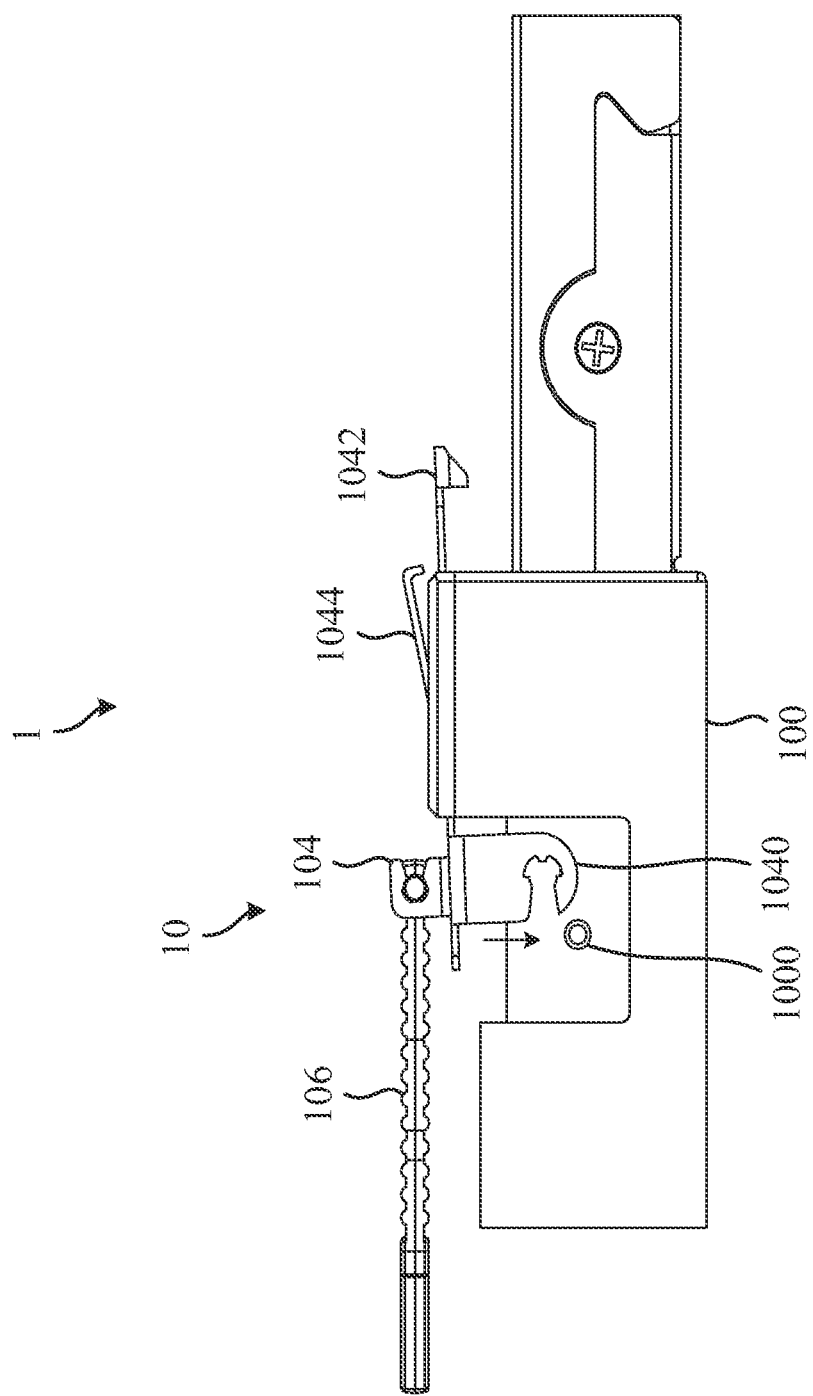
FIG. 3 is a schematic drawing of the assembly of the locking component to case in FIG. 1B.

In the above embodiment, the release mechanism 10 includes only four pieces of components (fixed component 102, locking component 104, pull component 106, and connecting pin 108). Therefore, the entire release mechanism 10 can be assembled easily by using basic tools such as screw drivers and pliers. Please refer to FIG. 3. FIG. 3 is a schematic drawing of the assembly of the locking component 104 to case 100 in FIG. 1B. As shown in FIG. 3, the case 100 includes a pin 1000 and the connecting part 1040 of the locking component 104 forms an opening to accept the pin 1000. The locking component 104 is drop down to the position where the opening of the connecting part 1040 aims at the pin 100 at the first step of the assembly, and then connecting part 1040 is drawn to snap at the pin 1000. As described above, the locking component 104 can be easily assembled to the case 100. The fewer components and the easy assembly of the release mechanism educe the total assembly cost of the transceiver module significantly.

Compared to the prior art, the release mechanism of the transceiver module in the present invention is provided with fewer components and easy assembly, so as to reduce the assembly cost of the transceiver module significantly. Also, the user can release or remove the transceiver module from the cage just by one step of pulling the release mechanism, so as to increase the convenience of the transceiver module.

Although the present invention has been illustrated and described with reference to the preferred embodiment thereof, it should be understood that it is in no way limited to the details of such embodiment but is capable of numerous modifications within the scope of the appended claims.

What is claimed is:

1. A release mechanism for releasing a transceiver module from a cage, the release mechanism comprising:
    a fixed component, fixed on the transceiver module;
    a locking component, having a connecting part, a hook opposite to the connecting part, and a spring part configured between the connecting part and the hook, the connecting part being pivotally connected to the transceiver module to enable the locking component to rotate relatively to the connecting part, the spring part being against the fixed component to resist the rotation of the locking component, the hook being for locking the transceiver module in the cage; and
    a pull component, connected to the locking component, for pulling the locking component to rotate to release the hook and the transceiver module from the cage.

2. The release mechanism of claim 1, further comprising a connecting pin for connecting the locking component and the pull component.

3. The release mechanism of claim 2, wherein the pull component comprises a sheath for the connecting pin being plugged therein, and the locking component comprises a fastening part for fastening the connecting pin.

4. The release mechanism of claim 1, wherein the spring part is a leaf spring extending from the main body of the locking component.

5. The release mechanism of claim 1, wherein the locking component has an opening for accepting a pin of the transceiver module to form the pivotal connection between the locking component and the transceiver module.

6. A transceiver module, comprising:
a case, for accepting a print circuit board and being plugged into a cage;
a fixed component, fixed on the case;
a locking component, having a connecting part, a hook opposite to the connecting part, and a spring part configured between the connecting part and the hook, the connecting part being pivotally connected to the case to enable the locking component to rotate relatively to the connecting part, the spring part being against the fixed component to resist the rotation of the locking component, the hook being for locking the case in the cage; and
a pull component, connected to the locking component, for pulling the locking component to rotate to release the hook and the case from the cage.

7. The transceiver module of claim 6, further comprising a connecting pin for connecting the locking component and the pull component.

8. The transceiver module of claim 7, wherein the pull component comprises a sheath for the connecting pin being plugged therein, and the locking component comprises a fastening part for fastening the connecting pin.

9. The transceiver module of claim 6, wherein the spring part is a leaf spring extending from the main body of the locking component.

10. The transceiver module of claim 6, wherein the locking component has an opening and the case has a pin, the opening accepts the pin to form the pivotal connection between the locking component and the case.

* * * * *